ވ

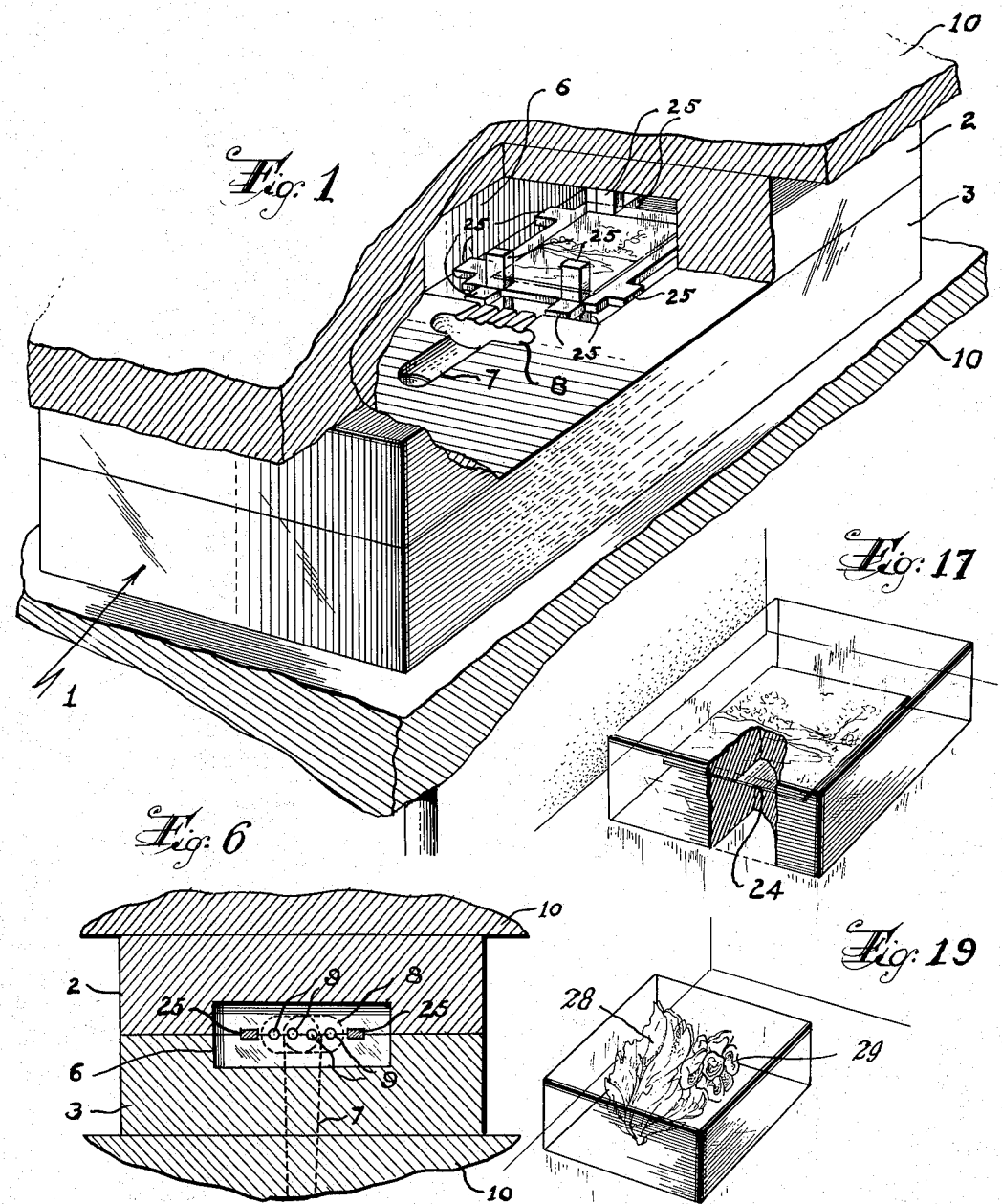

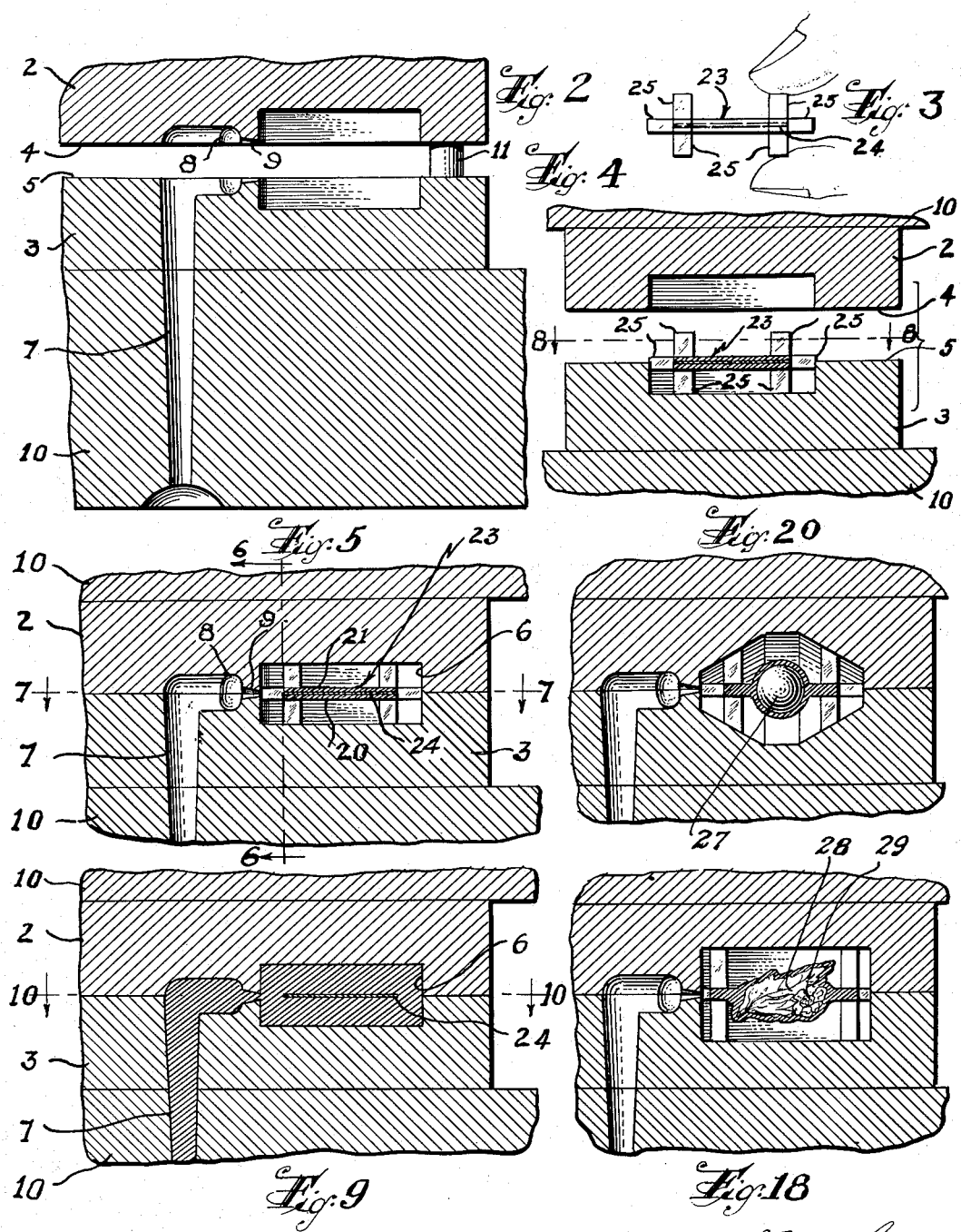

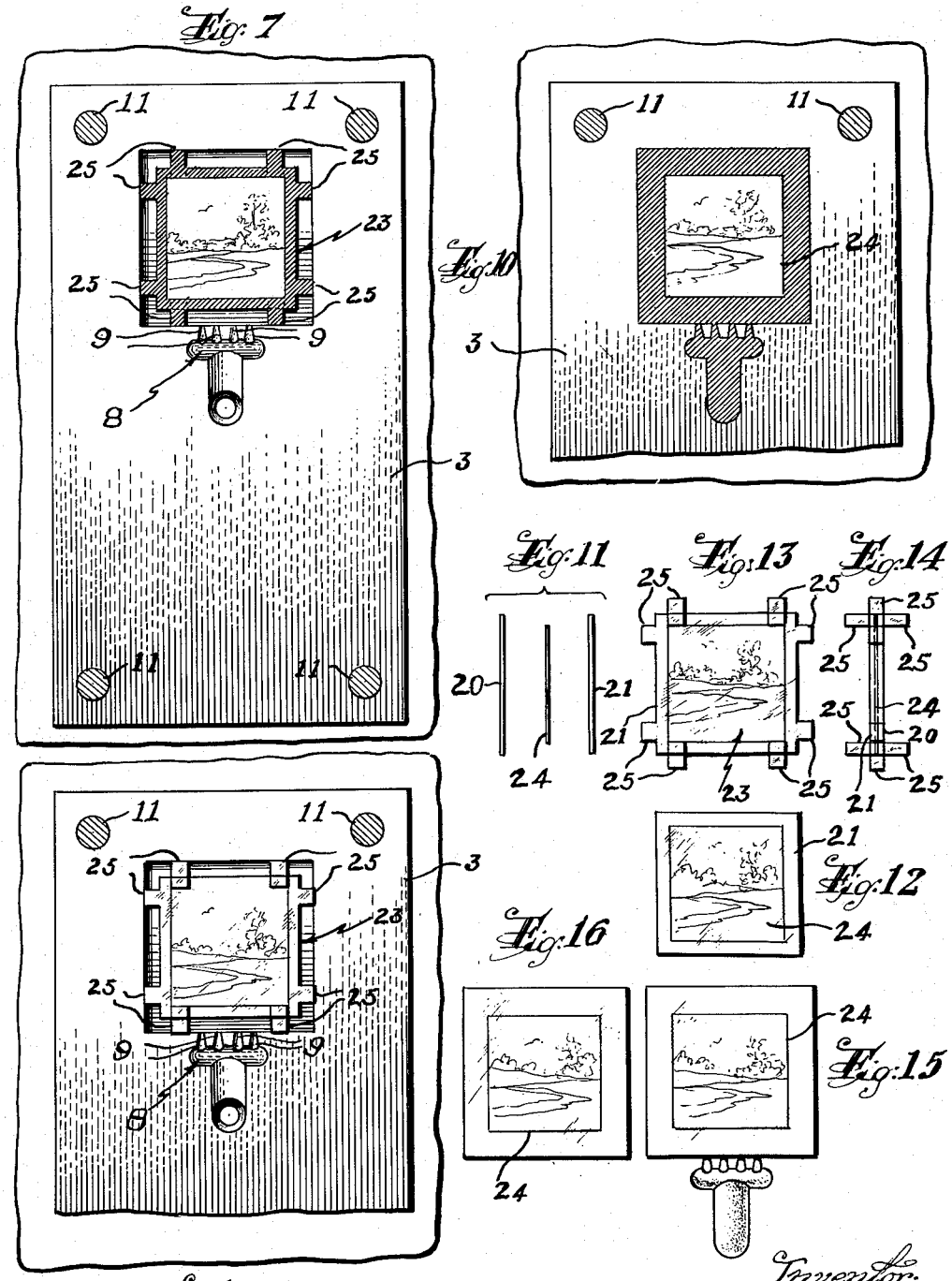

2,747,230

METHOD FOR PRODUCING PLASTIC ENCASED ARTICLES

Finn H. Magnus, Essex Fells, N. J.

Application April 24, 1952, Serial No. 284,157

3 Claims. (Cl. 18—59)

My invention relates to a method for producing plastic encased articles, and more particularly, to a method for encasing a decorative article such as a picture, leaf, flower or the like in a transparent plastic block.

If an article which is to be encased in a plastic form is directly exposed to the heat and pressure incident to a molding operation, it is likely that the article will be scorched or distorted out of shape, that its natural color will be lost and that the article will be displaced in the mold cavity, displacement in the mold cavity being especially likely when an injection molding process is used. When a decorative article is to be encased in a transparent plastic form and the resulting product used for purposes of display, it is of course necessary that the original shape and color of the decorative article be retained and that the article occupy a predetermined desirable position in its plastic encasement.

Accordingly, it is a prime object of my invention to provide a method particularly suitable for encasing decorative articles in a plastic form, which method assures that such decorative articles retain their original shape and color.

It is another object of my invention to provide a method for producing a plastic encased article which method incorporates novel and improved means for assuring a desired predetermined position of the article in its plastic encasement.

Other objects and advantages of my invention will appear as the course of the specification develops.

To attain the objects and advantages of my invention, I place an article which is to be encased in plastic between the halves of a preliminary plastic form adapted to receive the article. I cement these halves together to enclose the article in such preliminary form and place the preliminary form with the article enclosed in a mold cavity preparatory to the commencement of a molding operation. The preliminary form with the article enclosed therein is molded into the desired plastic form at a temperature and pressure just sufficient to erase the outline of the preliminary form. The preliminary form has a plurality of lugs formed thereon for maintaining the article in a desired position in the mold cavity during the molding operation.

In the accompanying drawings, one product, namely a plastic encased picture and the method of making it is depicted in Figs. 1 to 16. Modified forms of my invention are shown in Figs. 17 to 20. Fig. 1 is a perspective view of an assembled mold which is broken away to show the preliminary form positioned in the mold cavity. Fig. 2 is a sectional view of the mold of Fig. 1, illustrating the manner of its disassembly. Fig. 3 is an end view of the preliminary form preparatory to its insertion in the mold cavity. Fig. 4 is a sectional view of the mold of Fig. 1 showing the preliminary form positioned in the mold before assembly. Fig. 5 is a sectional view of the assembled mold with the preliminary form positioned in the mold cavity. Fig. 6 is a sectional view taken on the line 6—6 of Fig. 5 showing the points at which molten plastic enters the mold cavity. Fig. 7 is a top plan view taken on the line 7—7 of the assembled mold of Fig. 5. Fig. 8 is a top plan view taken on the line 8—8 of Fig. 4. Fig. 9 is a sectional view of the assembled mold showing the mold cavity and its associated conduit means as they appear the completion of a molding operation. Fig. 10 is a top plan view taken on the line 10—10 of Fig. 9. Fig. 11 is an end view of opposite sheets of the preliminary form and of the picture enclosed thereby, the parts being shown separated one from the other. Fig. 12 is a top plan view showing the picture enclosed between opposite sheets of the preliminary form. Fig. 13 is a top plan view of the assembled preliminary form apart from the mold cavity. Fig. 14 is an end view of the assembled preliminary form of Fig. 12. Fig. 15 is a top plan view of a molded plastic block before removal of additional plastic formed thereon as incident to the molding operation. Fig. 16 is a top plan view of a completed plastic block shown apart from the mold. Fig. 17 is a perspective view of the plastic block of Fig. 16. Fig. 18 is a sectional view of the assembled mold with a preliminary form peculiarly adapted to enclose a leaf and flow shown positioned in the mold cavity. Fig. 19 is a perspective view of a plastic block having a leaf and flow encased therein. Fig. 20 is a sectional view of an assembled mold showing a preliminary form enclosing a ball positioned in the mold cavity, which mold cavity is peculiarly adapted for the encasement of such article.

Similar reference characters refer to similar parts in each of the several views.

Referring to the drawings, reference character 1 designates a mold having an upper portion 2 and a lower portion 3, which portions are separable one from the other but which portions are also disposed in parallel relationship to each other with face 4 of portion 2 flush with face 5 of portion 3 when the mold is in its assembled state. Mold 1 as assembled includes both a mold cavity 6 extending into upper portion 2 and lower portion 3, and a passage or sprue 7 also extending into portions 2 and 3, which passage includes a gate 8 at one end having a plurality of nozzle-like passageways 9, which passageways connect with mold cavity 6. During a molding operation, mold faces 4 and 5 of portions 2 and 3 are held tightly against one another by jaws 10 of an injection molding machine such that faces 4 and 5 accurately and rightly contact with each other to prevent the escape of molding material therebetween. Mold portion 3 is held in some suitable manner in a fixed position with respect to lower jaw 10, while suitable means such as guide pins 11 are provided for holding mold portion 2 against lateral movement with respect to mold portion 3. Passage 7 extends through lower jaw 10 to connect with a supply of molten plastic.

Reference characters 20 and 21 designate opposite sides of a preliminary form 23 suitable for enclosing a picture 24 therein. Preliminary form 23 has a plurality of lugs 25 formed thereon for spacing the preliminary form in a desired manner with respect to the walls of mold cavity 6.

Assuming that it is desired to encase a picture 24 in a transparent plastic block, the first step in accomplishing this result (Figs. 1–17) is to mount the picture in preliminary form 23 by placing such picture between opposite sides 20 and 21 thereof and cementing these sides one to the other. Mold portion 2 is separated from mold portion 3 and preliminary form 23 with the picture enclosed therein in the described manner is placed in the block-shaped cavity 6. The mold is assembled and jaws 10 of the injection molding machine are operated to press the faces 4 and 5 of the mold portion tightly against one another whereupon molten plastic is forced through passages 7, gate 8 and nozzle-like passageways 9 into mold cavity 6. The molding operation is conducted at a temperature and pressure sufficiently high to produce a conglomerate plastic mass in which the outline of the plastic form is obliterated. Preferably, the temperature and pressure utilized should be only as high as necessary to erase the outline of the plastic form, it being desirable to keep the temperature and pressure during the molding operation as low as possible so as to maintain the original shape and color of the article enclosed in the preliminary form. It is to be noted that it is not necessary to reduce the preliminary form to a molten state and that it is necessary only to employ temperatures and pressures sufficiently high to erase the outline of the preliminary form. The preliminary form which may be of any desired thickness serves to protect the article enclosed therein against the effects of the heat and pressure incident to the molding operation. After formation of the aforementioned conglomerate plastic mass in the mold cavity the mold is allowed to cool to permit such conglomerate plastic mass to solidify in situ. After solidification, mold portion 2 is separated from mold portion 3, the solidified block or plastic encased article removed and any additional material formed thereon is broken off the block. As already noted, the preliminary form has a plurality of lugs formed thereon which space the form in a desired manner in the mold cavity thereby assuring a predetermined position for the article in its plastic encasement according to the length and disposition of such lugs.

Although the method which I have herein described results in the production of a block-shaped plastic encasement, obviously any desired form of encasement may be produced in the same manner by molding the encasement in a properly shaped cavity. One modified form of cavity is shown in Fig. 20 of the accompanying drawings. It should also be obvious that articles of various shapes may be encased by my process merely by adapting the preliminary form to the contour of the article to be encased. Fig. 20, for example, shows a preliminary form having a ball 27 enclosed therein, and Fig. 18 shows a preliminary form enclosing a leaf 28 and a flower 29. The preliminary form of Fig. 18 is shown therein positioned in the cavity of an assembled mold preparatory to initiation of the molding operation and the finished product is shown in Fig. 19.

It will now be apparent that I have a method for producing a plastic encased article, which method contemplates first enclosing the article in a preliminary form and then molding the article with additional material into the plastic encasement. The preliminary form is effective to protect the article from the heat and pressure incident to the molding operation thereby rendering my process particularly suitable for encasing decorative articles, the original color and shape of which must be retained. The preliminary form is provided with lugs for spacing the form in the mold cavity and in this manner a predetermined position is assured for the article in its plastic encasement.

Although I have illustrated and described only one form of my invention herein, it is to be understood that various changes and modifications may be made therein within the scope of my invention.

I claim:

1. A method of producing a plastic encased article comprising the steps of providing a preliminary form including two sections of cold and hard fusible transparent plastic material shaped to enclose said article between adjacent sides of the section of the preliminary form, positioning the article between said adjacent sides of said two sections of the preliminary form, cementing the juxtaposed surfaces of said two sections together in encircling relation to the article, thereby completely enclosing said article in said preliminary form, and molding and embedding said preliminary form in molten transparent plastic material and forming a body of a predetermined shape at a temperature and pressure only sufficient to fuse together the outer surface portions of the preliminary form and the molten plastic material so that the article is protected by the preliminary form against the heat and pressure of the molten material and appears to have been directly molded into said plastic body, and permitting the molten material to cool and harden in situ.

2. A method of producing a plastic encased article comprising the steps of providing a two sectional preliminary form of fusible transparent plastic material adapted to enclose said article between adjacent sides of the sections of said form, said preliminary form having a plurality of lugs formed thereon to engage the walls of a mold cavity for locating the article in a desired position in the cavity of the mold, positioning said article between the adjacent sides of said preliminary form, cementing said adjacent sides one to the other thereby enclosing said article in the preliminary form, positioning said preliminary form with the article enclosed therein in the cavity of said mold with said lugs in contact with the walls of the mold, and molding said preliminary form with additional fusible transparent plastic material to the shape of said cavity at a temperature and pressure sufficient to fuse the outer surfaces of the preliminary form with the additional plastic material so that the article appears to have been directly molded into said plastic body.

3. A method of producing a plastic encased article comprising the steps of providing a two sectional preliminary form of fusible transparent plastic material adapted to enclose said article between adjacent sides of the sections of said form, said preliminary form having a plurality of lugs formed thereon to engage the walls of a mold cavity for holding the form and the article therein against movement in all directions in the cavity of the mold, positioning said article between the adjacent sides of said preliminary form, cementing said adjacent sides one to the other thereby enclosing said article in the preliminary form, positioning said preliminary form with the article enclosed therein in the cavity of said mold with said lugs in contact with the walls of the mold, injecting molten transparent plastic material into the cavity of said mold around said preliminary form at a temperature and pressure sufficient to fuse the outer surfaces of the preliminary form with the injected plastic so that the article will appear to have been directly molded in its resulting plastic encasement, cooling said mold until said plastic mass solidifies to form the finished product and removing said finished product from the mold.

References Cited in the file of this patent

UNITED STATES PATENTS

| | | |
|---|---|---|
| 701,492 | Matthes | June 3, 1902 |
| 2,350,421 | Schoder | June 6, 1944 |
| 2,353,995 | Conner | July 18, 1944 |
| 2,354,857 | Gits et al. | Aug. 1, 1944 |
| 2,357,806 | Borkland | Sept. 12, 1944 |
| 2,376,085 | Radford | May 15, 1945 |
| 2,451,913 | Brice | Oct. 19, 1948 |
| 2,494,834 | Ringhein | Jan. 17, 1950 |
| 2,615,269 | Steinhardt | Oct. 28, 1952 |
| 2,684,503 | Silver | July 27, 1954 |